Oct. 20, 1959     H. C. DIENER, JR     2,909,259
ELECTRICAL CIRCUITRY USING STATIC ELECTROMAGNETIC DEVICES
Filed March 28, 1957     3 Sheets-Sheet 3
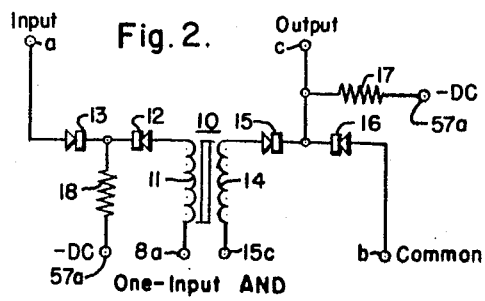
Fig. 2. One-Input AND
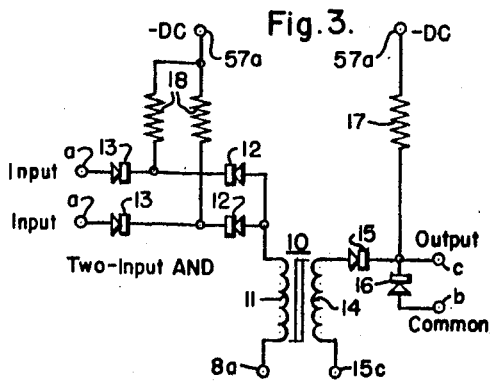
Fig. 3. Two-Input AND
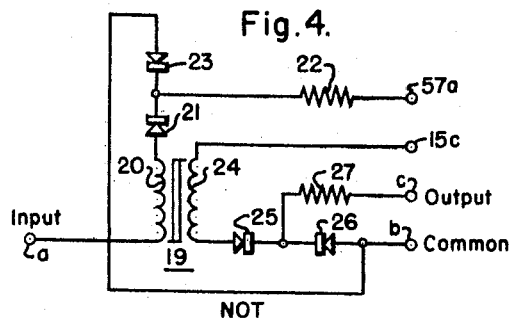
Fig. 4. NOT
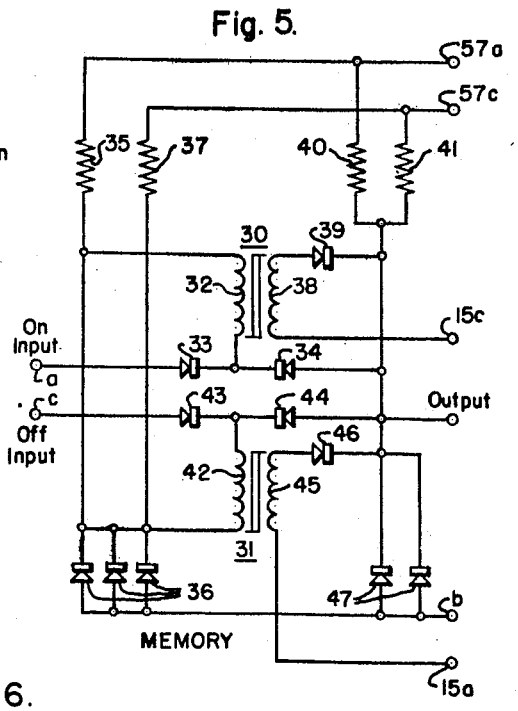
Fig. 5. MEMORY
Fig. 7.
| Function | A | B | C | D | E |
|---|---|---|---|---|---|
| Flywheel Brake | | | | X | |
| One-Shot | | X | | | X |
| Continuous | | | X | | X |
| Jog | X | | | | X |
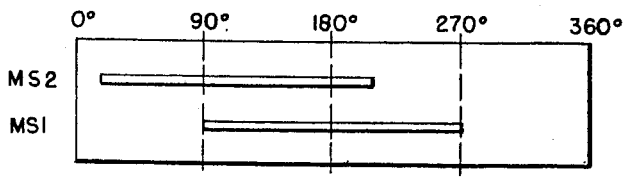
Fig. 6.

United States Patent Office 2,909,259
Patented Oct. 20, 1959

2,909,259

ELECTRICAL CIRCUITRY USING STATIC ELECTROMAGNETIC DEVICES

Henry C. Diener, Jr., Depew, N.Y., assignor to Westinghouse Electric Corporation, East Pittsburgh, Pa., a corporation of Pennsylvania Application March 28, 1957, Serial No. 649,250

10 Claims. (Cl. 192—144)

This invention relates to electrical systems utilizing static logic decision elements for controlling cyclically operating machines such as forging presses.

One embodiment of this invention is an electrical control system for a power press having a ram driven by a motor through a flywheel and a clutch. The clutch is engaged and disengaged by a piston in a cylinder to which compressed air is applied through a solenoid-operated valve. A brake is provided for stopping movement of the ram after the clutch is disengaged. The brake is engaged and disengaged by a piston in a cylinder to which compressed air is applied through another solenoid-operated valve. A switch responsive to fluid pressure in the brake control cylinder is used to control the solenoid of the valve of the brake control so that the clutch cannot be engaged before the brake is released. It is desired to operate such a punch press at the choice of an operator in one of the following operations: One shot; continuous; or jog.

An object of this invention is to provide a control circuit utilizing static logic decision elements for causing a cyclically operating machine to automatically go through a selected operation.

Another object of this invention is to provide a control circuit utilizing the static logic elements for causing a cyclically operating machine to go through one cycle of a selected operation, and at the end of the cycle to be prepared to repeat the previous cycle or to go through another separate operation.

Another object of this invention is to provide a control circuit utilizing static logic units, including a memory unit, for causing a cyclically operating machine to go through a selected operation and in which, in case of power failure, the memory unit is turned off so that any previous signal cannot be retained by the memory unit.

Another object of this invention is to provide in a control circuit utilizing a Memory unit, that the Memory unit be prevented, in case of a power failure, from retaining any previous signal.

Another and more specific object of this invention is to control with static logic decision units, a punch press having a clutch for connecting the press to its driving motor, and moving a brake to be released before the clutch is engaged.

This invention will now be described with reference to the annexed drawings, of which:

Fig. 1, comprising 1A and 1B portions, shows a block diagram of a control system for a forging press embodying this invention;

Fig. 2 shows a circuit of a one input And unit used in the system of Fig. 1;

Fig. 3 shows a circuit of a two input And unit used in the system of Fig. 1;

Fig. 4 shows a circuit of a Not unit used in the system of Fig. 1;

Fig. 5 shows a circuit of a Memory unit used in the system of Fig. 1;

Fig. 6 is a plot showing the "on" periods of the limit switches of Fig. 1; and

Fig. 7 is a chart showing which operator preselector switches are closed for the different operations of the forging press of Fig. 1.

Figure 1A:
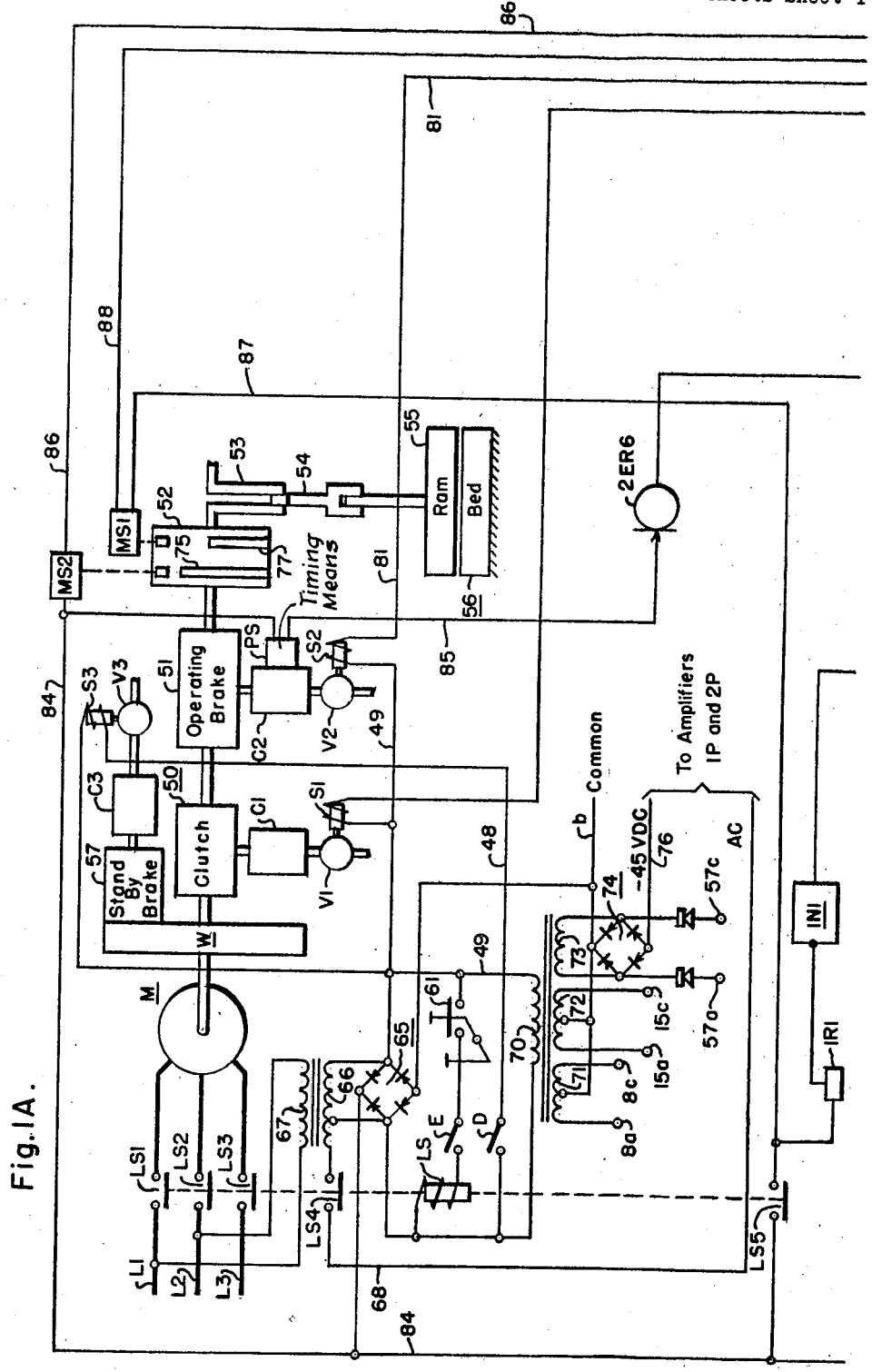
Figure 1B:
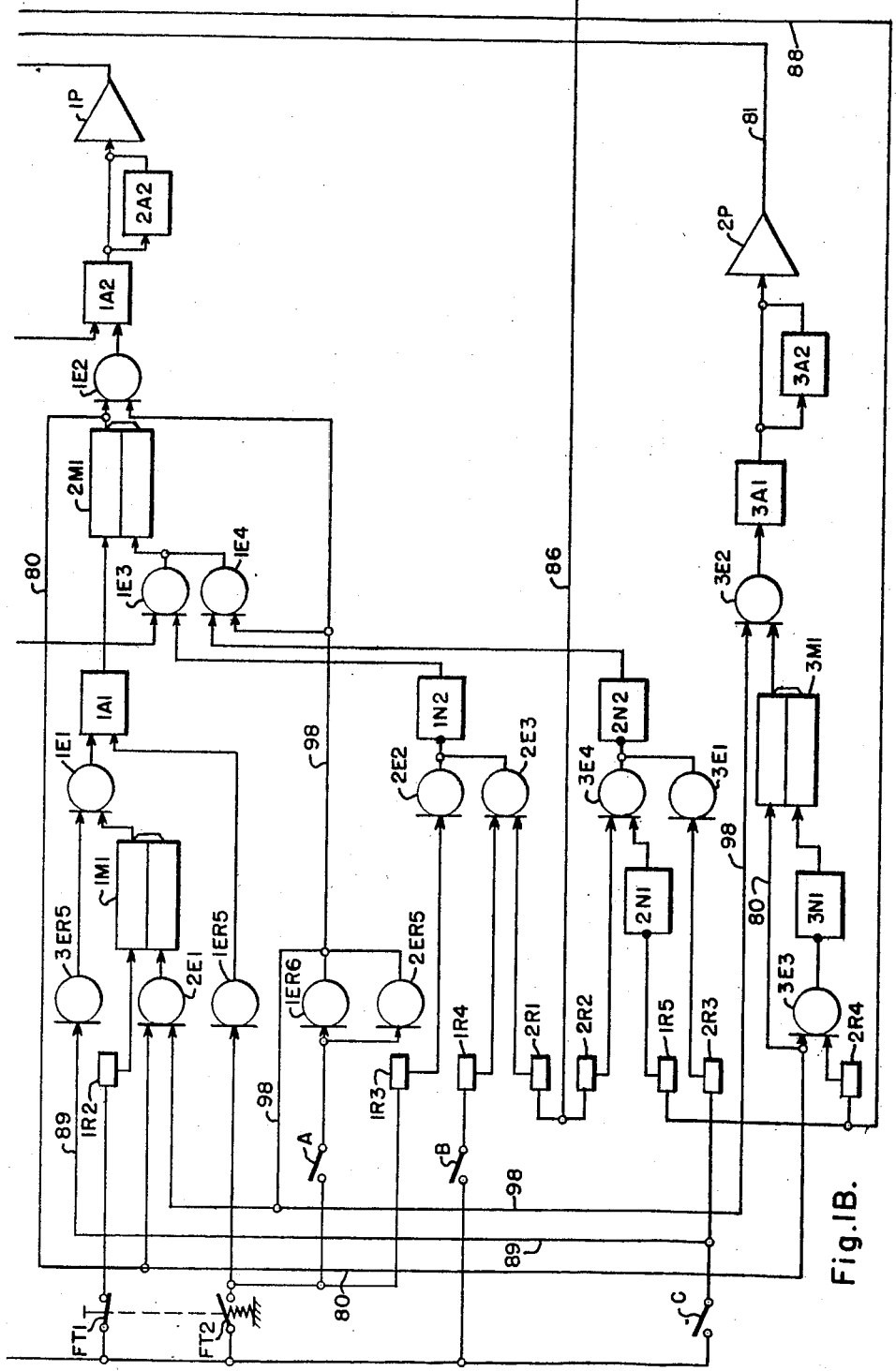

The And, Or, Not and Memory circuits for use in the practice of this invention are similar to those described in the July 1956 edition of Westinghouse Engineer, volume 16, No. 4, published by Westinghouse Electric Corporation, Pittsburgh, Pa., but since the And, Not and Memory circuits must have their A.C. and D.C. supply terminals connected to corresponding terminals of their power supply having the proper phases and polarities, these units are shown by Figs. 2–5 of the drawings for the purpose of explaining how their connections to the A.C. and D.C. power supply terminals of Fig. 1 should be made. It is believed to be proper at this time to describe these logic circuits generally as follows:

An And circuit is a circuit that responds to a plurality of signals having the same phase, and has an output signal only when all of the signals are present. The phase of the output signal of an And circuit is opposite to that of its input signals. A one-input And circuit can be used for phase reversal when only one input signal is present. Fig. 2 shows a one-input And circuit having a terminal legended Input which is indicated to receive an input signal $a$. It has a terminal legended Output which is indicated to provide a $c$ output signal. The $a$ and $c$ signals have opposite phase. The circuit of Fig. 2 has a mutual inductance 10 with a core having a rectangular hysteresis loop, and which has a reset winding 11 connected at one end through oppositely poled diodes 12 and 13 connected and poled as shown, and connected at its other end to A.C. terminal 8a of Fig. 1. The mutual inductance 10 has a gate winding 14 connected at one end through the forwardly poled diode 15 to the Output terminal. The diode 15 is connected through an oppositely poled diode 16 to $b$ (common) terminal of Fig. 1. The Output terminal is connected through a resistor 17 to a D.C. terminal 57a of Fig. 1. The other end of the winding 14 is connected to A.C. terminal 15c of Fig. 1. The midpoint connection between the diodes 12 and 13 is connected through a resistor 18 to D.C. terminal 57a of Fig. 1.

If the input signal is a $c$ signal, all power connections of Fig. 2 would be reversely connected to the power supply terminals of Fig. 1. That is, the 57a and 8a terminals of Fig. 2 would be the terminals 57c and 8c, respectively, of Fig. 1, and the 15c terminal of Fig. 2 would be connected to the 15a terminal of Fig. 1.

Control of the input of Fig. 2 is derived from the reset winding 11 magnetizing force which is opposite to that of the gate winding 14. With an input missing, thus resetting the core, no output of a specified phase $a$ or $c$ is produced. When a signal voltage of the proper magnitude and phase is introduced at the input, the rectifiers 12 and 13 are blocked when the reset current is zero so that the gate winding circuit causes the core to saturate, and produces a half-wave output.

Fig. 3 is a two-input And circuit, and is similar to Fig. 2 except that another input terminal is provided, and it operates in the same manner as Fig. 2, except that a signal of the proper phase at either of the two inputs will cause an output signal.

A Not circuit is a circuit which has substantially zero output when an input control signal of the proper phase is applied thereto, and an output signal when there is no input signal. Fig. 4 shows such a circuit, and comprises a mutual inductance 19 having a core with a rectangular hysteresis loop with a reset winding 20 connected at one end to an Input terminal and at the other end through diode 21 would be connected through an oppositely poled diode 23 to *b* terminal of Fig. 1. The mutual inductance 19 has a gate winding 24 connected at one end to the 15*c* terminal of Fig. 1, and connected at its other end through oppositely poled diodes 25 and 26 to the *b* terminal. The junction between the diodes 25 and 26 is connected through a resistor 27 to the Output terminal. No A.C. resetting voltage is used in this circuit as in the case of Figs. 2 and 3. Exciting current in the gate winding 24 causes the core to saturate when a signal of the proper phase is present, and to produce an output signal. When an input signal of the proper phase and magnitude is present, reset current flows through the reset winding 20 which is 180° out-of-phase with the gating voltage, so that there is no output. The circuit as shown is for receiving an *a* input signal. If a *c* input signal is to be received, the connection to 57*a* would be changed to 57*c*, and the connection to 15*c* would be changed to 15*a*.

A Memory circuit is a bistable circuit that, in response to a first or "on" input signal, produces an output signal that is maintained even though the first signal has ended. The Memory circuit is reset and the output signal is terminated in response to a second input or "off" signal having the opposite phase to the first signal. Fig. 5 shows a Memory circuit having mutual inductances 30 and 31 with cores having rectangular hysteresis loops. The mutual inductance 30 has a reset winding 32 connected at one end through diode 34 to the Output terminal, and through diode 33 to the On Input terminal. The winding 32 is connected at its other end through resistor 35 to the 57*a* terminal of Fig. 1, and connected through parallel-connected diodes 36 to the *b* connection of Fig. 1. The gating winding 38 of mutual inductance 30 is connected through diode 39 to the output and through resistor 40 to the 57*a* terminal of Fig. 1, and through resistor 41 to the 57*c* terminal of Fig. 1. The other end of the winding 38 is connected to the 15*c* terminal of Fig. 1.

The mutual inductance 31 has a reset winding 42 connected through diode 43 to the Off Input terminal, and through diode 44 to the Output terminal. The other end of the winding 42 is connected through the diodes 36 to the *b* terminal of Fig. 1, and through the resistor 35 to the 57*a* terminal and through resistor 37 to the 57*c* terminal of Fig. 1. The mutual inductance 31 has a gating winding 45 connected through diode 46 to the output and through parallel-connected diodes 47 to the *b* connection, and connected at its other end to the 15*a* terminal of Fig. 1.

The Memory circuit is seen to consist of two Not circuits which are sensitive to opposite phase input signals. A continuous output is provided when the first input signal *c* occurs, and the output is stopped when the second input signal *a* occurs. The Not circuits are connected in parallel, but the A.C. voltages are connected with the phase relationships shown, so that one of the two cores is gating while the other is resetting. The common output voltage is fed back to the common control circuit so that the output of one Not circuit serves as the input to the other. Once an output has been established, a signal is continuously provided to maintain this output without the necessity of applying an external signal. If the input terminal shown receiving an *a* input signal is to receive a *c* input signal, and the input terminal shown receiving a *c* input signal is to receive an *a* signal, then the power supply connections to the terminals having *a* and *c* suffixes would be reversed.

On Fig. 1, the input signals to the And, Not and Memory units are shown as *a* or *c* so that the proper connections to the power supply can be made.

An Or circuit supplies an output signal when any input signal is applied. It requires no A.C. or D.C. supply connections, and so is not shown. It may have only a single input.

Referring now to Fig. 1 of the drawings, an induction motor M, drives a flywheel W, which in turn, is connected through a clutch 50 and a brake 51 to a limit switch drum 52 and press crank arm 53. The crank arm is connected through linkage 54 to a ram 55. A bed 56 is below the ram 55, the latter being moved towards and away from the bed when the crank arm is rotated. The flywheel W is provided with a standby brake 57 to stop the flywheel and motor, if for any reason such stopping is desired, which may include stopping at shut-down. This brake is not engaged, however, when the electric power is off.

The motor M is connected to three-phase supply lines L1, L2 and L3 when the line starter contacts LS1, LS2 and LS3 are closed. The line starter is energized when the switch E, and the stop and start switch 61 are closed. When closed, these switches connect the line starter solenoid LS to bridge rectifier 65 which has its alternating current or input terminals connected, respectively, to one end, and to a tap on transformer secondary winding 66, the corresponding primary winding 67 being connected to the supply lines L1 and L2.

The line starter has two additional contacts LS4 and LS5 which are closed when the solenoid LS is energized. When LS4 is closed, it connects the other end of the secondary winding 66 to A.C. connection 68 for amplifiers 1P and 2P. When LS5 is closed, it connects resistor 1R1 to the rectifier 65 for supplying a signal to the Not unit 1N1.

A primary winding 70 of another transformer has its terminals connected, respectively, to said tap, and to said one end of said secondary winding 66, and has three secondary windings 71, 72 and 73. The winding 71 supplies eight volts A.C. to its terminals 8*a* and 8*c*. The winding 72 supplies fifteen volts to its terminals 15*a* and 15*c*. The winding 73 is connected to a bridge rectifier 74 and supplies 57 volts D.C. to its terminals 57*a* and 57*c*. The rectifier 74 supplies −45 volts D.C. to conductor 76 for connection to the amplifiers 1P and 2P. The midpoints of the secondary windings 71 and 72, and the rectifier 74 are connected to a conductor *b* which is a common conductor for the power supplies of the logic units. The And, Not and Memory units of the system must be connected to supply terminals having the proper phases and polarities as has been described in connection with Figs. 2–5.

The clutch 50 is adapted to be engaged by a piston in a cylinder C1 when a fluid under pressure such as compressed air is admitted into the cylinder when valve V1 is opened by the energization of solenoid S1.

The operating brake 51 is adapted to be disengaged by a piston in a cylinder C2 when compressed air is admitted into the cylinder C2 when valve V2 is opened by the energization of solenoid S2. The cylinder C2 has a switch PS connected thereto which switch constitutes timing means because it closes, after admission of fluid pressure to cylinder C2, when a predetermined pressure has been built up within the cylinder C2. A pressure actuated timing switch suitable for the purpose is shown in the Canfield Patent No. 2,248,851.

The standby brake 57 is actuated to brake the flywheel W by a piston within cylinder C3 when compressed air is admitted into C3 when valve V3 is opened by the energization of solenoid S3.

Switches A, B, C, D and E are provided for selecting the type of operation, and are closed for the different operations as shown by Fig. 7. They may be closed by a conventional selector switch which is not shown, set in a preliminary selection step, by the operator of the punch press.

A foot treadle having the mechanically connected switches FT1 and FT2 is provided for actuating the press after its type of operation has been selected, the switch FT1 being opened when FT2 is closed, and vice versa.

The limit switch drum 52 has on its periphery a pair of cam risers 75 and 77 which are engaged by rollers of limit switches MS2 and MS1, respectively. Fig. 6 shows the durations of the closings of these switches during crank arm rotation, 0° and 360° corresponding to the lowermost position of the ram.

The selector switch would initially be on "Flywheel Brake" position with only switch D closed, and supplying power from the input terminals of the primary winding 70 through conductors 48 and 49 to the solenoid S3, energizing the latter to open the valve V3, so as to supply compressed air into the cylinder C3 to apply the standby brake 57.

When the selector switch is set to any one of the three operating positions, the switch D would be opened, releasing the flywheel brake, and the switch E would be closed so that when the series-connected start switch 61 is closed the line starter solenoid LS is energized to start the motor M.

One-shot cycle

For a One-Shot Cycle, the switches B and E would be closed. The closing of switch E and start switch 61 would cause the motor M to start. The closing of the selector switch B supplies, through resistor 1R4 and Or unit 2E3, a signal to Not unit 1N2 preventing it from having an output throughout this cycle. (1N2 is used in the Continuous Cycle.) The foot treadle is in the unactivated position with its switch FT1 closed, and supplying a signal through resistor 1R2 to Memory unit 1M1 turning it on and supplying an input signal to the Or unit 1E1 which in turn supplies one signal to the And unit 1A1. When the foot treadle is depressed, its switch FT1 is opened, and its switch FT2 is closed, supplying a signal through Or unit 1ER5 supplying a second signal to the And unit 1A1 where it combines with the 1M1 signal to provide an output signal which is applied to Memory unit 2M1 to turn it on. The Memory unit 2M1 supplies a signal to the Or unit 1E2, which in turn supplies one signal to the And unit 1A2. The foot treadle can now be released. Unit 2M1 through line 80 and Or unit 2E1 also applies a signal to turn off Memory unit 1M1 which was previously turned on by FT1 placing it in condition for the start of the next cycle. The signal from line 80 is transmitted by the Or unit 3E3, but any output to the Memory unit 3M1 is blocked by the Not unit 3N1. Memory unit 3M1, however, turns on directly from the signal from line 80. The latter then supplies a signal through Or unit 3E2 and And unit 3A1 to magnetic amplifier 2P which energizes through lines 81 and 49 the solenoid S2 which opens valve V2 which admits compressed air into cylinder C2 to release the brake 51. The one input And unit 3A2, since the circuitry is phase sensitive, transmits the signal from the And unit 3A1 in the event it is of the wrong phase. The input to amplifier 2P is thus independent of phase. Switch PS is closed by the pressure in the cylinder C2, and supplies a signal from rectifier 65 through lines 84 and 85 Or unit 2ER6 the And unit 1A2 which was previously supplied with a signal from 2M1. The two input signals to 1A2 cause it to supply an output signal to the magnetic amplifier 1P which energizes the solenoid S1, causing the valve V1 to open and admit compressed air into the cylinder C1, and engaging the clutch 50 for connecting the ram 55 to the rotating flywheel W. The pressure switch PS thus prevents the clutch from being engaged before the brake 51 is released. The one input And unit 2A2, since the circuitry is phase sensitive, transmits the signal from the And unit 1A2 in the event it is of the wrong phase. The input to amplifier 1P is thus independent of phase.

Shortly after the clutch is engaged and the ram starts moving from its start position, the limit switch MS2 is closed by the cam riser 75, and connects through line 86, resistor 2R2 to the rectifier 65, supplying through resistor 2R2, Or unit 3E4, a signal to the Not unit 2N2 which also is receiving a signal from 2N1, and has no output. Then at about 90° rotation, the limit switch MS1 closes, connecting, through conductor 84, contacts LS5, conductor 87, limit switch MS1 and conductor 88, the rectifier 65 to the resistor 1R5, supplying a signal to the Not unit 2N1 cutting off its output to 2N2. It also supplies signal through resistor 2R4 and Or unit 3E3, a signal to Not unit 3N1 cutting off its output. The limit switch MS2, after the crank has moved to about the 200° position, then opens, permitting an output from 2N2, the other input signal to 2N2 having been removed by the closing of MS1 and the cutting off of the output of 2N1. The output signal from 2N2 applied through 1E4 to the off input of 2M1, cuts off 2M1, and the previously described "on" signal to 3M1 supplied by 2M1. When 2M1 is cut off, the solenoid S1 is deenergized, the valve V1 is closed and the clutch 50 is disengaged. MS1 then opens and blocks the output of 2N2, and permits output from 3N1. 3M1 is turned off by 3N1, and the solenoid S2 is deenergized, causing the brake 51 to be applied and stopping movement of the ram. The cycle is repeated when the foot treadle is again depressed.

In One-Shot operation the foot treadle need not be held down until a limit switch closes. One short pulse causes the Memory unit 2M1 to take control, and the press to go through the entire cycle.

Continuous cycle

For Continuous Cycle operation, the selector switches C and E would be closed in a preliminary step. Switch C connects through line 84, resistor 2R3 to the rectifier 65, supplying a signal through 2R3 and the Or unit 3E1, to the Not unit 2N2 keeping it off. It also supplies through line 89, and Or units 3ER5 and 1E1, one of the two signals to And unit 1A1. After the Start switch 61 has been closed, the foot treadle would be depressed, closing the switch FT2, connecting the Or unit 1ER5 through line 84 to the rectifier 65, supplying through 1ER5, the added signal to the And unit 1A1 for providing an output therefrom causing the latter to deliver an output signal to turn the Memory unit 2M1 on. 2M1 causes energization of the solenoid S2 through 3M1, 3E2, 3A1, 3A2 and 2P as previously described. When the pressure switch PS closes as a result of the rise in pressure in the cylinder C2, it causes through 2ER6, 1A2, 2A2 and 1P as previously described, the solenoid S1 to be energized and the clutch 50 to be engaged after the brake 51 is released. Depression of the foot treadle maintains through 1R3 and 2E2, a signal on 1N2 preventing it from delivering an output signal to stop the press. When the foot treadle is released, an output signal will be delivered by 1N2 except when the limit switch MS2 is closed. MS2, when closed, prevents an output signal from 1N2. When the foot treadle is released, its switch FT2 opens cutting off the signal through 1R3 and 2E2 to 1N2. When the other signal to 1N2 is cut off by the opening of limit switch MS2, 1N2 turns off 2M1 and subsequently deenergizes solenoid S1, causing the clutch 50 to be disengaged. When MS1 is opened and 2M1 is off as previously described, the solenoid S2 is deenergized, causing the brake 51 to be applied. In such continuous operation the foot treadle would be held down by the operator until the limit switch MS2 closes.

Jog cycle

For Jog Cycle operation, the selector switches A and E would be closed. Then after the Start switch 61 has been closed, and the foot treadle depressed, the switch FT2 of the latter is closed and connects through line 98 and Or unit 1E4, the rectifier 65 to the Memory unit 2M1 supplying a signal for keeping it off. This signal is also applied through line 98 and through 3E2, 3A1, 3A2 to amplifier 2P causing the latter to energize the solenoid S2 which then acts to disengage the brake 51. Then when pressure switch PS is closed, it applies a signal through 2ER6, 1A2, 2A2 to amplifier 1P which energizes the solenoid S1 to cause the clutch to be engaged to start the movement of the ram.

When the signal is removed by releasing the foot treadle, the clutch is again disengaged, and the brake 51 is again applied.

The depression of the foot treadle is always required to start a press cycle, it not being possible to start a cycle by actuating a limit switch only. Thus, if the limit switches are being adjusted, the press will not operate unless the foot treadle is also depressed.

When the switch E is opened, the solenoid LS cannot be energized, and the contacts LS4 and LS5 are not closed. The amplifiers P1 and P2 receive no power so that the control system is ineffective. Power failure causes all of the contacts LS1, LS2, LS3, LS4 and LS5 to be opened, and removes the input signal to the Not unit 1N1, causing it, through the Or unit 1E3 to apply a signal to the off input of Memory unit 2M1, turning it off. When power is restored, the Memory unit 2M1 remains off so that the clutch 50 and brake 51 cannot be engaged by any previous signals retained in the Memory circuits. The start switch 61 must always be closed to resume operation.

From the foregoing description, it should be apparent that I have provided a system for the control of punch presses or other types of presses such as forging presses through the use of static logic decision elements. This system provides control circuits having a minimum of moving parts so as to provide for maximum life and minimum maintenance.

I claim as my invention:

1. A control system for a mechanical load having rotary means for driving the load, clutch means for connecting the load to and disconnecting the load from said rotary means, and braking means for stopping the load after said clutch means has disconnected the load from said rotary means, comprising a first Memory unit having on and off inputs and an output, a foot treadle having a normally closed switch and a normally open switch, means including said closed switch for supplying a signal to the on input of said Memory unit for turning it on, a second Memory unit having on and off inputs and an output, a two-input And unit having its output connected to the on input of said second Memory unit and having one of its inputs connected to the output of said first Memory unit, means for supplying a signal to the other input of said And unit when said normally open switch is closed, means connecting the off input of said first Memory unit to the output of said second Memory unit for turning said first Memory unit off, a third Memory unit having on and off inputs and an output, connections connecting the on input of said third Memory unit to the output of said second Memory unit for turning said third Memory unit on, means including first circuit means connected to the output of said third Memory unit for disengaging said braking means, a second two-input And unit having one input connected to the output of said second Memory unit and having an output, timing means interconnected with said first circuit means, second circuit means connecting said timing means to the other input of said second And unit for delivering a signal thereto after said braking means has been disengaged, and means including means using the output signal of said second And unit to actuate said clutch means to connect said load to said rotary means.

2. A control system as claimed in claim 1 in which limit switch means driven through the operation of the load is provided, and in which means including said limit switch means is provided for supplying a signal to the off input of said second Memory for causing said clutch means to disengage said rotary means and further supplying a signal to the off input of said third Memory unit for causing said braking means to become engaged to stop said load.

3. A control system for a mechanical load having rotary means for driving the load, clutch means for connecting the load to and disconnecting the load from said rotary means, and braking means for stopping the load after said clutch means has disconnected the load from said rotary means, comprising a foot treadle having a normally closed and a normally open switch, a first Memory unit having an on input connected to said normally closed switch and having an off input and an output, a second Memory unit having an on and an off input and an output, a two-input And unit having its output connected to said on input of said second Memory unit and having one of its inputs connected to the output of said first Memory unit, a first Or unit connecting the other input of said And unit to said normally open switch, means connecting the output of said second Memory unit to the off input of said first Memory unit, a third Memory unit having on and off inputs and an output, means connecting the on input of said third Memory unit to the output of said second Memory unit, a second Or unit having an input connected to the output of said third Memory unit, an And unit having an input connected to the output of said Or unit, a magnetic amplifier having its input connected to the output of said second And unit, fluid operated means for disengaging said braking means, a solenoid-operated valve for admitting fluid under pressure into said fluid operated means, means including said amplifier for energizing the solenoid of said solenoid-operated valve, a pressure switch closed by fluid pressure in said fluid operated means, a third Or unit, means actuated by the closing of said pressure switch for supplying a signal to an input of said third Or unit, a second two-input And unit having one input connected to the output of said third Or unit, a fourth Or unit having one of its inputs connected to the output of said second Memory unit, and having its output connected to the other input of said second two-input And unit, a second magnetic amplifier having its input connected to the output of said second two-input And unit, fluid operated means for engaging said clutch means, a solenoid-operated valve for admitting fluid under pressure into said last-mentioned fluid operated means, and means including means using the output signal of said second amplifier for energizing the solenoid of said last-mentioned solenoid-operated valve.

4. A control system as claimed in claim 3 in which limit switch means driven through the operation of the load is provided, and in which means including said limit switch means is provided for supplying a signal to the off input of said second Memory unit for causing said clutch means to disengage said rotary means, and further supplying a signal to the off input of said third Memory unit for causing said braking means to stop said load.

5. A control system for a mechanical load having rotary means for driving the load, clutch means for connecting the load to and disconnecting the load from said rotary means, and braking means for stopping the load when said clutch means has disconnected the load from said rotary means, comprising a two-input And unit, means including a selector switch and an operator actuated switch for supplying signals to the inputs of said And unit, a first Memory unit having on and off inputs and an output, circuit means connecting the output of said And unit to the on input of said first Memory unit for causing it to have an output signal, a second Memory unit having on and off inputs and an output, circuit means connecting the on input of said second Memory unit to the output of said first Memory unit for causing said second Memory unit to have an output signal, means including circuit means connected to the output of said second Memory unit for disengaging said braking means, a second two-input And unit having one input connected to the output of said first Memory unit, timing means connected to said means for disengaging said braking means and to the other input of said second two-input And unit and delivering a signal to said second two-input And unit after said braking means has been disengaged, and means including means actuated by the output signal from said second two-input And unit to actuate said clutch means to connect said load to said rotary means.

6. A control system as claimed in claim 5 in which a Not unit is provided, in which the Not unit has an input connected to said operator actuated switch, in which limit switch means driven by movement of the load is provided and connected to said input of said Not unit, and in which circuit means is provided for connecting the output of said Not unit to the off input of said first Memory unit.

7. A control system as claimed in claim 6 in which the means for disengaging said braking means comprises a cylinder into which fluid under pressure is admitted, and in which the timing means comprises a pressure switch actuated by the pressure in the cylinder.

8. A control system as claimed in claim 6 in which other limit switch means driven by movement of the load is provided, and in which control means including said other limit switch means is provided for supplying a signal to the off input of said second Memory unit for causing said clutch means to disengage said clutch, and for causing said braking means to become engaged to stop the load.

9. A control system as claimed in claim 8 in which the control means for disengaging said braking means comprises a cylinder into which a fluid under pressure is admitted, and in which the timing means comprises a pressure switch actuated by the pressure in the cylinder.

10. A control system for a mechanical load having an electric motor for driving the load, a power supply circuit for said motor, clutch means for connecting the load to and disconnecting the load from said motor, and braking means for stopping the load when said clutch means has disconnected the load from said motor, comprising a first Memory unit having on and off inputs, means including an operator closed switch for supplying a signal to said on input for turning said first Memory unit on, a second Memory unit having an on input and an output, circuit means connecting the output of said first Memory unit to the on input of said second Memory unit, means including circuit means connected to said output of said second Memory unit for disengaging said braking means and actuating said clutch means to connect said press to said rotary means, a Not unit and circuit means connecting the input of said Not unit to said supply circuit, and the output of said Not unit to said off input of said second Memory unit, said Not unit turning off said second Memory unit in case of power failure.

References Cited in the file of this patent
UNITED STATES PATENTS

| | | |
|---|---|---|
| 2,471,505 | Winther | May 31, 1949 |
| 2,695,993 | Haynes | Nov. 30, 1954 |
| 2,745,530 | Foster | May 15, 1956 |
| 2,753,545 | Lund | July 3, 1956 |